United States Patent
Vaughan et al.

(10) Patent No.: US 10,002,713 B1
(45) Date of Patent: Jun. 19, 2018

(54) SELF-DAMPING MLCC ARRAY

(71) Applicant: KEMET Electronics Corporation, Simpsonville, SC (US)

(72) Inventors: Randal J. Vaughan, Simpsonville, SC (US); Abhijit Gurav, Simpsonville, SC (US); Gregory L. Crosby, Simpsonville, SC (US); Buli Xu, Columbia, SC (US)

(73) Assignee: KEMET Electronics Corporation, Simpsonville, SC (US)

( * ) Notice: Subject to any disclaimer, the term of this patent is extended or adjusted under 35 U.S.C. 154(b) by 0 days. days.

(21) Appl. No.: 15/876,873

(22) Filed: Jan. 22, 2018

Related U.S. Application Data

(60) Provisional application No. 62/450,173, filed on Jan. 25, 2017.

(51) Int. Cl.
| | |
|---|---|
| *H01G 4/30* | (2006.01) |
| *H04R 3/04* | (2006.01) |
| *H01G 4/228* | (2006.01) |
| *H01G 4/12* | (2006.01) |

(52) U.S. Cl.
CPC ............ *H01G 4/30* (2013.01); *H01G 4/1209* (2013.01); *H01G 4/228* (2013.01); *H04R 3/04* (2013.01)

(58) Field of Classification Search
None
See application file for complete search history.

(56) References Cited

U.S. PATENT DOCUMENTS

| | | | | |
|---|---|---|---|---|
| 2014/0307889 | A1* | 10/2014 | Hardell | G10K 11/1782 381/71.11 |
| 2014/0368967 | A1* | 12/2014 | Ahn | H01G 4/30 361/301.4 |
| 2016/0093441 | A1* | 3/2016 | Ahn | H01G 4/232 174/260 |
| 2017/0064811 | A1* | 3/2017 | Li | H01G 4/224 |
| 2017/0105283 | A1* | 4/2017 | Kim | H05K 1/0271 |

* cited by examiner

*Primary Examiner* — Paul Huber
(74) *Attorney, Agent, or Firm* — Joseph T. Guy; Patent Filing Specialist, Inc.

(57) ABSTRACT

An electronic component with a self-damping MLCC is provided. The electronic component comprising a pulse signal generator and a substrate comprising first traces and second traces. An MLCC is provided comprising a first capacitive couple between two first external terminations and a second capacitive couple between two second external terminations wherein each first external termination is in electrical contact with a different first trace and each second external termination is in electrical contact with a different second trace. The pulse signal generator provides a first pulse to the first traces and a second pulse to the second traces wherein the first pulse and second pulse are not in phase.

39 Claims, 11 Drawing Sheets

SELF-DAMPING MLCC ARRAY

CROSS-REFERENCE TO RELATED APPLICATIONS

The present application claims priority to U.S. Provisional Patent Application No. 62/450,173 filed Jan. 25, 2017 which is incorporated herein by reference.

BACKGROUND

The present invention is related to a multi-layered ceramic capacitor (MLCC) mounted on a substrate wherein the MLCC provides self-damping properties. More specifically, the present invention is related to an MLCC, or array of MLCC's, in a circuit wherein elements of the MLCC are out of electrical phase thereby providing damping of microphonic noise.

MLCC's manufactured with polarized dielectrics, such as barium titanate, are prone to microphonic noise. Microphonic noise is believed to be caused by electrostriction, as well as the piezoelectric effect, which are related to the movement of ceramic that occurs in the presence of an applied electric field. The ceramic movement can be transferred to the circuit board, on which the component is mounted, as vibrational energy ultimately producing an audible noise when electric field is applied. With leadless capacitors mounted on a circuit board microphonic noise is significantly enhanced which limits their application, particularly, in portable devices such as cell phones and the like.

Microphonic noise is a particular problem with alternating current (AC) systems as the microphonic noise tends to occur at the frequency of the AC signal, 60 Hz for example, or other vibrational frequencies and the vibration of the dielectric is transferred to the substrate and surrounding components thereby providing an audible noise. This is a particular problem in small devices and especially in devices such as headphones, devices intended for playing music and the like.

The art has primarily focused on reducing microphonic noise by physical structural alterations wherein the MLCC is mounted to the substrate in a manner suitable for eliminating, or reducing, transfer of the vibrational energy to the substrate. While somewhat successful, structural techniques designed to minimize transfer of vibrational energy do not eliminate the generation of microphonic noise and therefore the problem is not completely solved. When multiple devices are in phase the microphonic noises may be summed, or may generate harmonics, and therefore the noise is still generated even if the transfer is muted.

The present invention provides an MLCC array wherein the microphonic noise is dampened internally thereby eliminating the physical constraints related to structural techniques as typically practiced in the art. By damping the microphonic noise internally the MLCC can be surface mounted thereby significantly increasing the flexibility of design.

SUMMARY

It is an object of the invention to provide an improved electronic device wherein the device has less microphonic noise.

It is another object of invention to provide an MLCC which is self-damping, with regards to microphonic noise, thereby eliminating physical constraints typically employed for microphonic noise reduction.

A particular feature of the invention is the ability to form a self-damping MLCC using conventional manufacturing techniques and practices.

These and other advantages, as will be realized, are provided in an electronic component comprising a pulse signal generator, preferably an AC pulse generator, and a substrate comprising first traces and second traces. An MLCC is provided comprising a first capacitive couple between two first external terminations and a second capacitive couple between two second external terminations wherein each first external termination of the first external terminations is in electrical contact with a different first trace of the first traces and each second external termination of the second external terminations is in electrical contact with a different second trace of the second traces. The pulse signal generator provides a first pulse, preferably an AC pulse, to the first traces and a second pulse, preferably an AC pulse, to the second traces wherein the first pulse and second pulse are not in phase.

Yet another embodiment is provided in an electronic component comprising a pulse signal generator and a substrate comprising first traces and second traces. A first MLCC comprising a first capacitive couple is between two first external terminations wherein each first external termination of the first external terminations is in electrical contact with a different first trace of the first traces. A second MLCC comprising a second capacitive couple between two second external terminations wherein each second external termination of the second external terminations is in electrical contact with a different second trace of the second traces. The pulse signal generator provides a first pulse to the first traces and a second pulse to the second traces wherein the first pulse and the second pulse are not in phase.

Yet another embodiment is provided in an electronic component comprising a pulse signal generator and a substrate comprising a first positive trace, a first negative trace, a second positive trace and second negative trace. An MLCC is on the substrate wherein the MLCC comprises a first capacitive couple electrically connected between the first positive trace and first negative trace and a second capacitive couple is electrically connected between the second positive trace and second negative trace. The pulse signal generator provides a first pulse to first positive trace and a second pulse to second positive trace wherein first pulse and second pulse are not in phase.

Yet another embodiment is provided in an electronic component comprising a pulse signal generator and a substrate comprising first traces and second traces. A first MLCC is on the substrate wherein the MLCC comprises a first capacitive couple between two first external terminations wherein each first external termination is in electrical contact with a different first trace. A second MLCC comprising a second capacitive couple is between two second external terminations wherein each second external termination is in electrical contact with a different second trace. The pulse signal generator provides a first pulse to the first traces and a second pulse to the second traces wherein the first pulse and second pulse are not in phase.

Yet another embodiment is provided in an electronic component comprising a pulse signal generator and an MLCC comprising a first capacitive couple having a first electrical contact with the pulse signal generator and a second capacitive couple having a second electrical contact with the pulse signal generator. The pulse signal generator provides a first pulse to the first capacitive couple through the first electrical contact and a second pulse to the second capacitive couple through the second electrical contact wherein the first pulse and second pulse are not in phase.

Yet another embodiment is provided in An electronic circuit comprising an MLCC comprising a first capacitive element energized by an AC pulse having a first phase and a second capacitive element energized by an AC pulse having a second phase wherein the first phase and second phase are out of phase by 180°±60°.

BRIEF DESCRIPTION OF DRAWINGS

FIG. 10 illustrates an embodiment of the invention.

DESCRIPTION

The present invention is related to an improved MLCC array, and electronic device comprising the array, wherein at least one MLCC is mounted to a substrate and the MLCC has self-damping properties, with regards to microphonic noise, wherein the MLCC has first capacitive electrodes in a first electrical phase and second capacitive electrodes in a second electrical phase wherein the first phase is sufficiently out of phase with the second phase to dampen, and preferably eliminate, the microphonic noise by noise cancellation.

MLCC's are well known in the art to comprise a capacitive couple comprising a multiplicity of conductive layers, with dielectric there between, wherein alternate layers terminate at external terminations of opposite polarity. In one embodiment of the instant invention a self-damping MLCC comprises a first capacitive couple and a second capacitive couple wherein the first capacitive couple and second capacitive couple are out of electrical phase.

The invention will be described with reference to the various figures forming an integral, but non-limiting, component of the invention. Throughout the description similar elements will be numbered accordingly.

Figure 1:
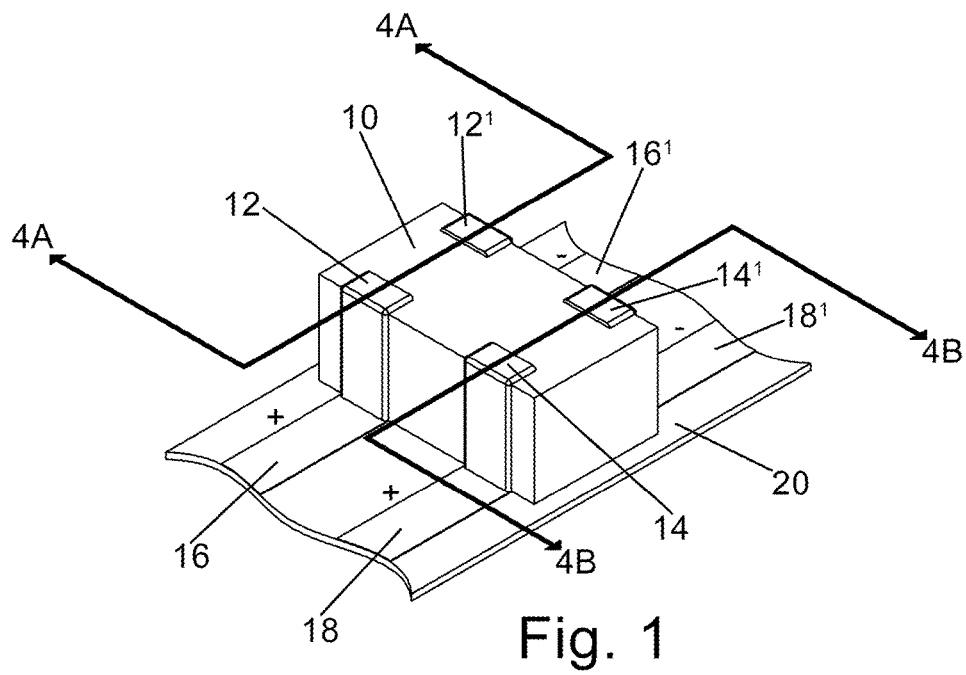
FIG. 1 is a schematic representation of an embodiment of the invention.
Figure 3:
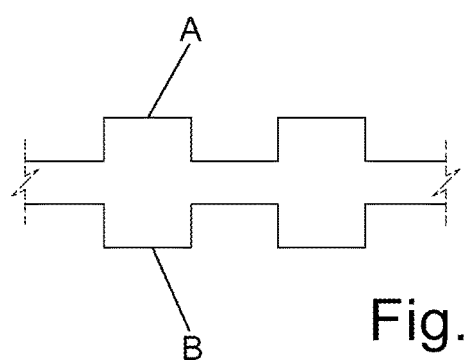
FIG. 3 is a graphical representation of an AC signal employed with the embodiment of FIG. 1.

An MLCC, 10, is illustrated schematically in FIG. 1, wherein external terminations, 12, represent a first capacitive couple and external terminations, 14, represent a second capacitive couple within a common MLCC. The MLCC illustrated in FIG. 1 would comprise the conductive layers illustrated in FIG. 2 wherein the first conductive couple comprises layers $A^1$ and $A^2$ in alternating arrangement, with dielectric there between, and the second conductive couple comprises layers $B^1$ and $B^2$ in alternating arrangement, with dielectric there between. As would be realized alternate tabs, 100, will be in electrical contact with a common external termination. The MLCC, 10, is mounted to a substrate, 20, wherein the substrate comprises traces, 16 and 18, arbitrarily labeled as positive and ground traces. The AC signal applied to the two capacitive couples is illustrated in FIG. 3 wherein the first conductive couple, 12, is subjected to an AC signal in a first phase, A, through traces, 16, and the second conductive couple, 14, is subjected to an AC signal in a second phase, B, through traces, 18. By subjecting the two capacitive couples to AC signals that are out of phase, and most preferably of opposite phase, the constriction/expansion of the dielectric between plates A is opposite the constriction/expansion of the dielectric between plates B and therefore the microphonic noise created by capacitive couple A is cancelled, or at least damped, by the microphonic noise created by capacitive couple B.

Figure 2:
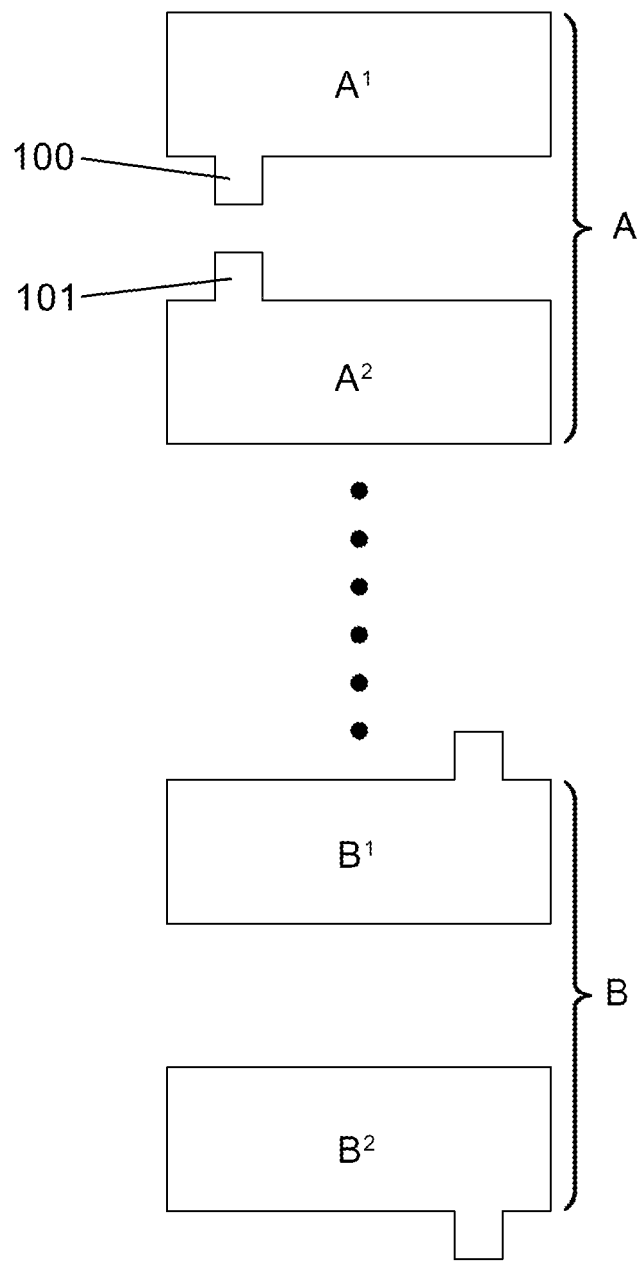
FIG. 2 is a schematic representation of the internal electrodes, or conductors, of the embodiment of FIG. 1 which are preferably in a vertically arranged array.
Figure 4A:
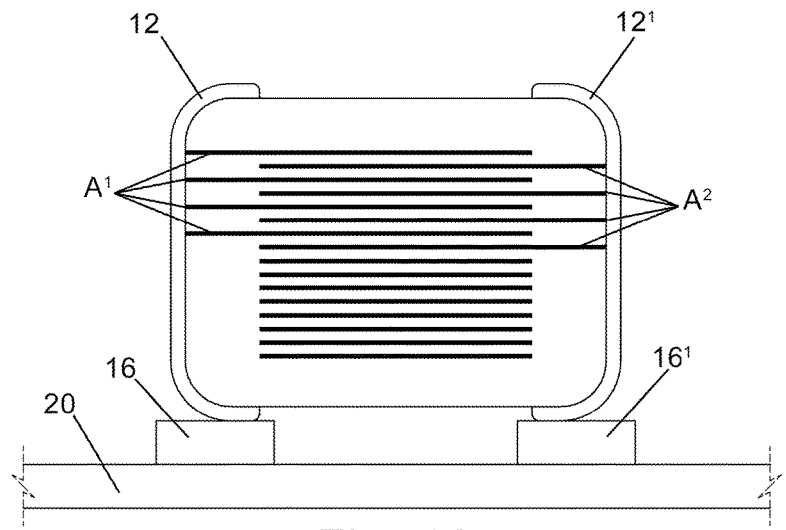
FIGS. 4A and 4B are schematic cross-sectional views of an embodiment of the invention.
Figure 4B:
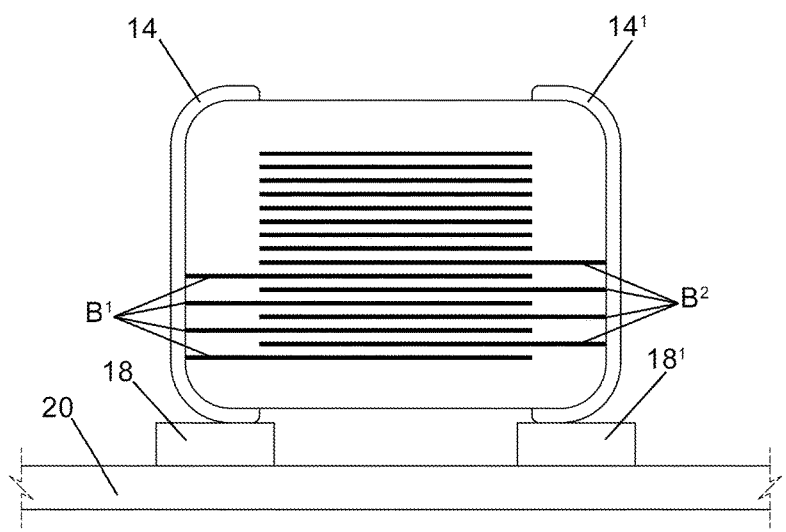

An embodiment of the invention is illustrated in schematic cross-section view in FIG. 4A taken along line 4A-4A in FIG. 1 and in schematic cross-section view in FIG. 4B taken along line 4B-4B in FIG. 1. The internal electrodes, as illustrated schematically in FIG. 2, are arranged with a first set of conductive layers, A of FIG. 2 for example, form a first capacitive couple between external terminations 12 and 12'. A second set of electrodes, B of FIG. 2 for example, form a second capacitive couple between external terminations 14 and 14'. In the embodiment illustrated schematically in FIGS. 4A and 4B the number of internal electrodes in the first set of internal electrodes is approximately the same as in the second set of electrodes which is preferable in some embodiments.

The number of conductive layers in the first conductive couple and the second conductive couple can be quite high, such as hundreds of layers, and the number in the first conductive couple and second conductive couple may be the same or different. In an embodiment the number of layers in the first conductive couple and second conductive couple are the same and therefore the MLCC is essentially physically, and electrically, symmetrical. In another embodiment the number of conductive layers in the first capacitive couple and the number of conductive layers in the second conductive couple is different and therefore the MLCC is essentially physically, and electrically, asymmetrical as will be further described herein. In an embodiment the internal electrodes are perpendicular to the substrate. In another embodiment the internal electrodes are parallel to the substrate.

An embodiment of the invention will be described with reference to FIG. 5 wherein the MLCC comprises a series of capacitive couples which are labeled A-D for the purposes of discussion. Each capacitive couple can be independently electrically connected to circuit traces or they can be electrically connected in combinations. By way of example, capacitive couple A can be in electrical connection with a first set of circuit traces wherein capacitive couple A is energized with an AC pulse of a first phase. Capacitive couples B-D may be active capacitive couples which provide a capacitance function to the circuit with each active capacitive couple in electrical connection with a common circuit trace, or independent circuit traces, and each active capacitive couple is energized with a common AC pulse having a second phase different from the first phase. In this embodiment capacitive couple A will dampen any noise generated collectively by capacitive couples B-D. As would be realized multiple capacitive couples may be energized with the first phase, such as capacitive couples A and C for example, to provide dampening with capacitive couples B and D, in this example, being active capacitive couples energized with a second phase and providing the function of capacitance to the circuit.

Figure 5:
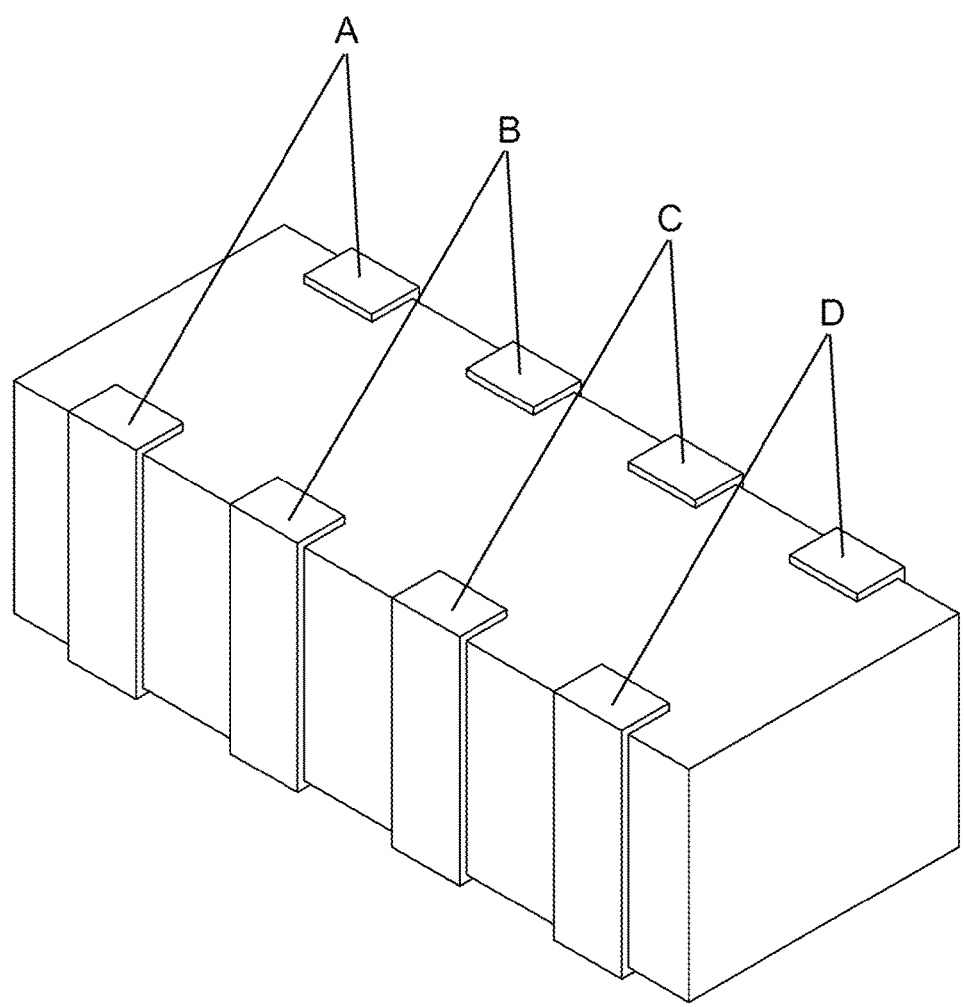
FIG. 5 is a schematic perspective view of an embodiment of the invention.

The measured noise for two different capacitors differing by capacitance but with each having four capacitive couples, as represented by FIG. 5, is provided in Table 1. Each MLCC was energized at 6V and 1 kHz. In Table 1, for the controls all capacitive couples were energized with the same phase resulting in a high noise, reported as decibels (dBA). Using the same MLCC, when adjacent capacitive couples, such as A and B, were energized with pulses of opposite polarity, or 180° out of phase, and alternate capacitive couples, such as A and C, were energized with a common pulse, the noise level dropped by about two orders of magnitude.

TABLE 1

|  | First Pulse | Second Pulse | dBA |
| --- | --- | --- | --- |
| Control 1 | ABCD | — | 52 |
| Inventive 1 | AC | BD | 29 |
| Control 2 | ABCD | — | 65 |
| Inventive 2 | AC | BD | 44 |

Figure 6:
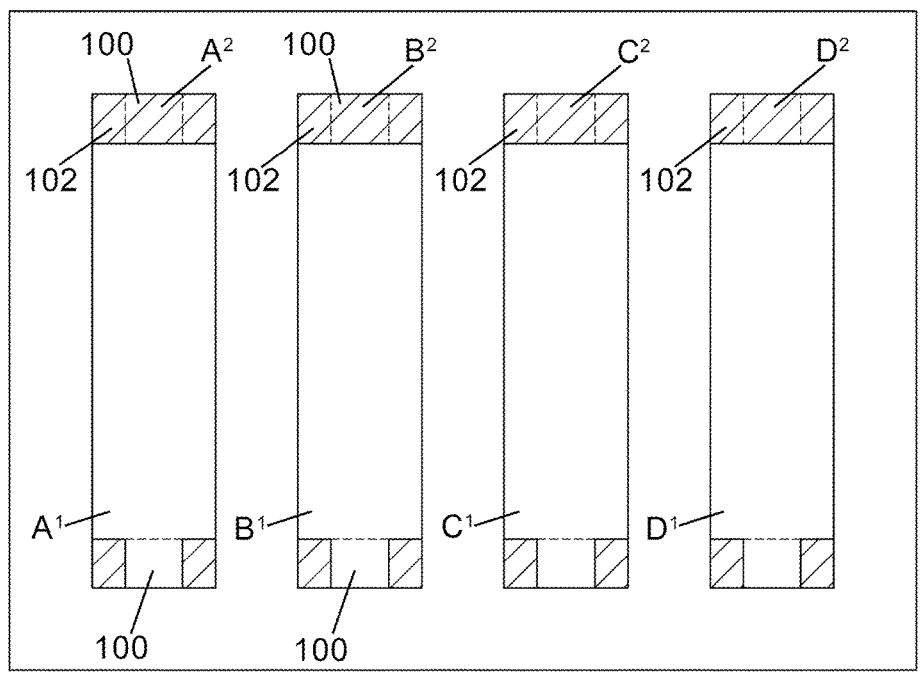
FIG. 6 is a schematic representation of an embodiment of the invention which is preferably in a horizontally arranged array.
Figure 7:
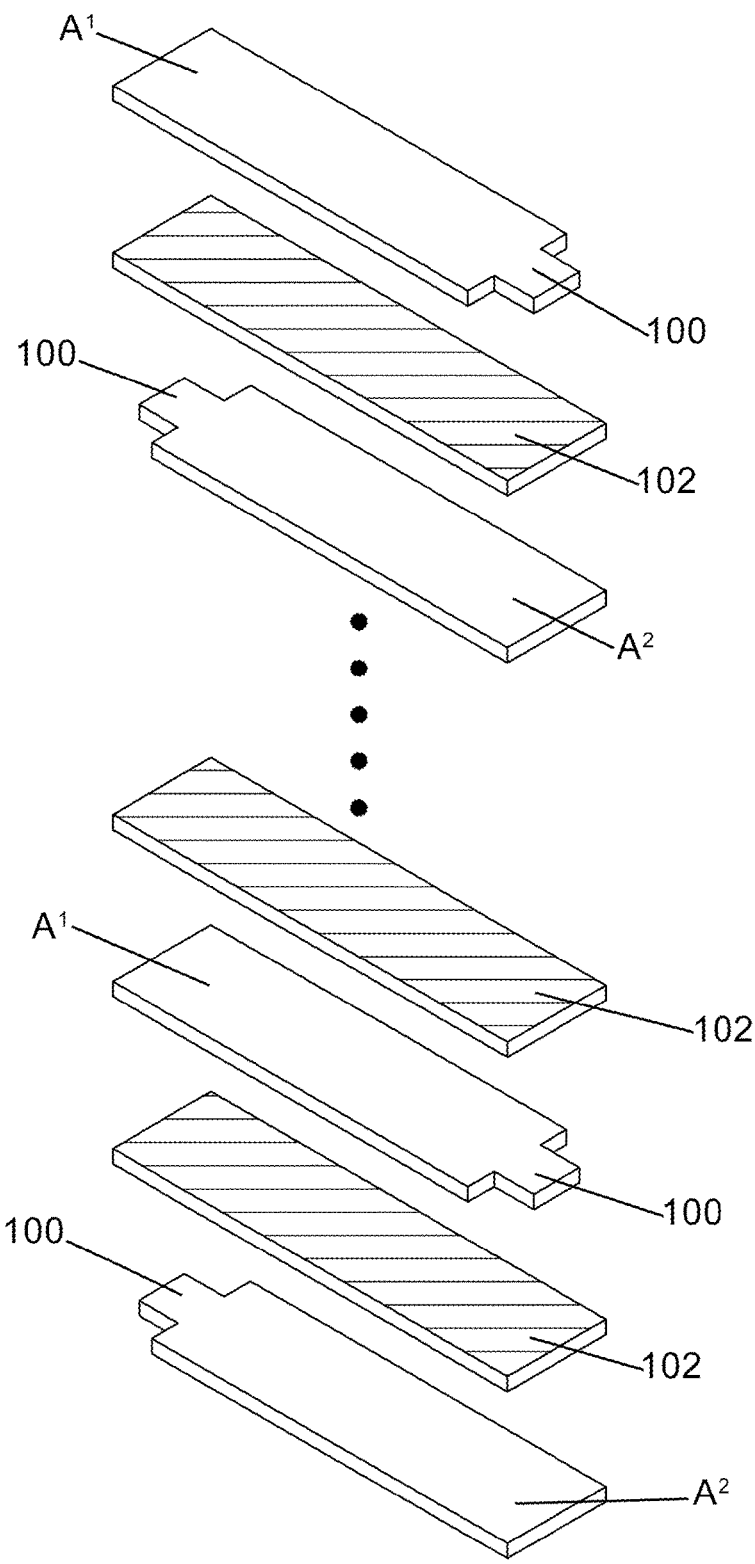
FIG. 7 is a schematic exploded view of a portion of the horizontal array of FIG. 6.

Electrodes for the capacitor of FIG. 5, which are in horizontally arranged array, are illustrated in schematic top view in FIG. 6. A partial layer of conductive layers, using stack A as an example, is illustrated in a partial exploded schematic view in FIG. 7. As would be realized, the tabs, 100, of alternate conductive layers would be in registration and ultimately in electrical contact with a common external termination. A dielectric, 102, is between each conductive layer. Therefore, in a given stack adjacent conductive layers form a capacitive couple.

Figure 8A:
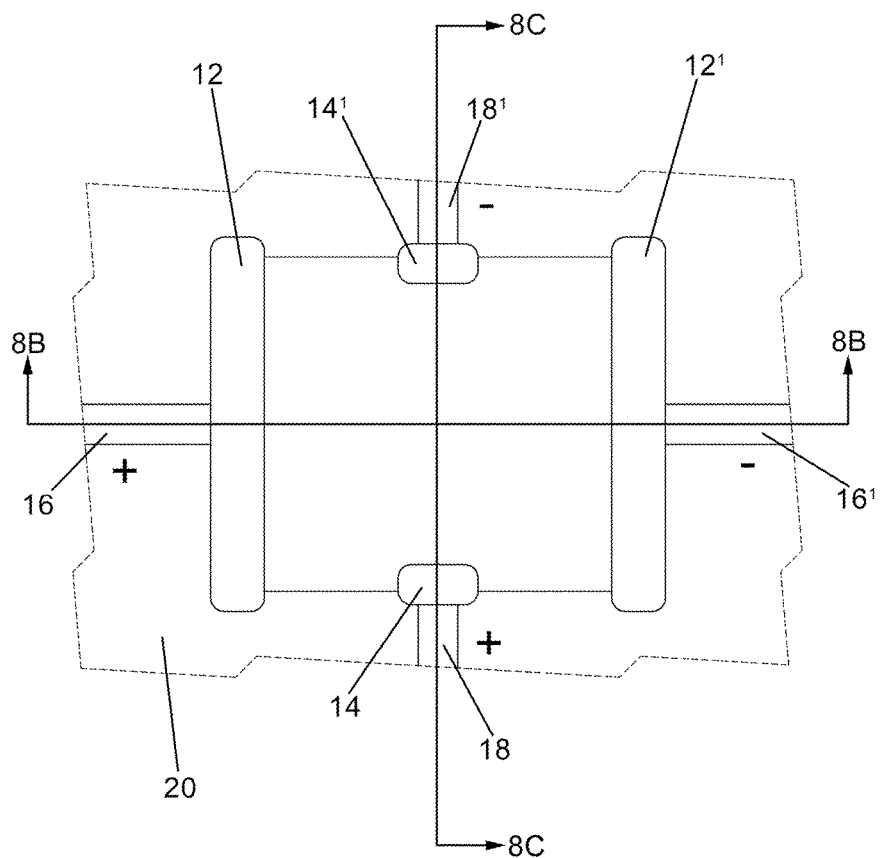
FIG. 8A is a schematic top view of an embodiment of the invention.
Figure 8B:
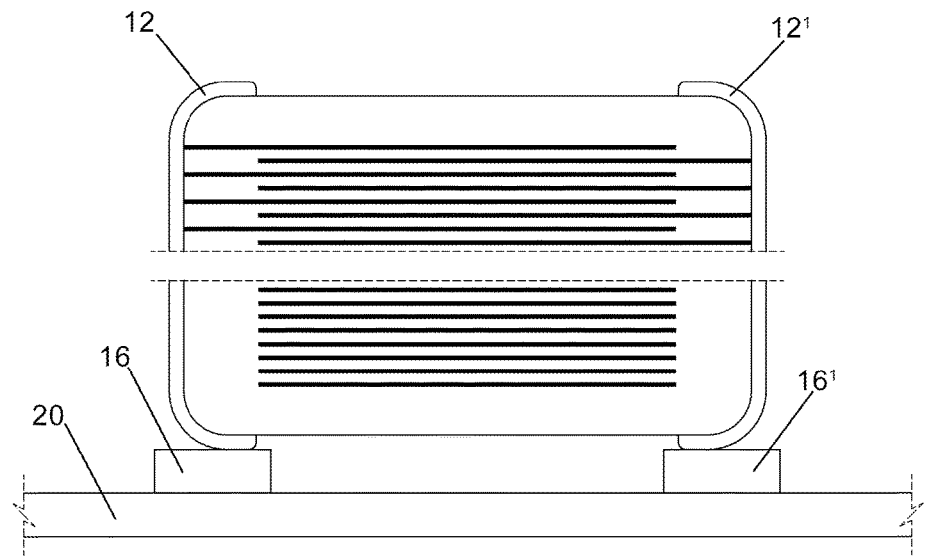
FIGS. 8B and 8C are cross-sectional views of the embodiment of FIG. 8.
Figure 8C:
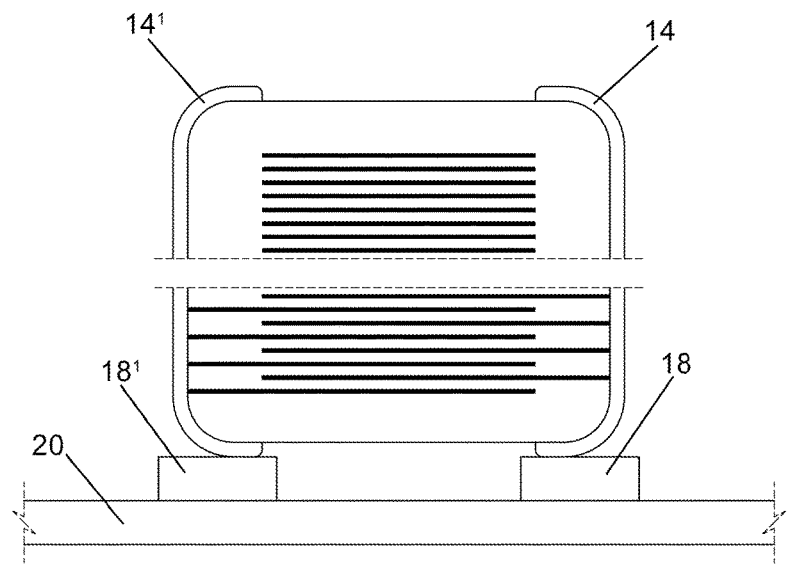

An embodiment of an electronic component of the invention is illustrated in schematic top view in FIG. 8A. In FIG. 8A the MLCC comprises a first capacitive couple, terminating at external terminations 12 and 12', and terminated perpendicular thereto is a second capacitive couple terminating at external terminations 14 and 14'. As illustrated the MLCC is mounted, to a circuit board, 20, comprising a first set of traces, 16 and 16', in electrical contact with the first capacitive couple and a second set of traces, 18 and 18', in electrical contact with the second capacitive couple. A cross-sectional view of the electronic component, taken along line 8B-8B of FIG. 8A is illustrated in FIG. 8B and a cross-sectional view of the electronic component, taken along line 8C-8C of FIG. 8A is illustrated in FIG. 8C. As would be realized the first capacitive couple is further from the substrate, 20, than the second capacitive couple.

Figure 9:
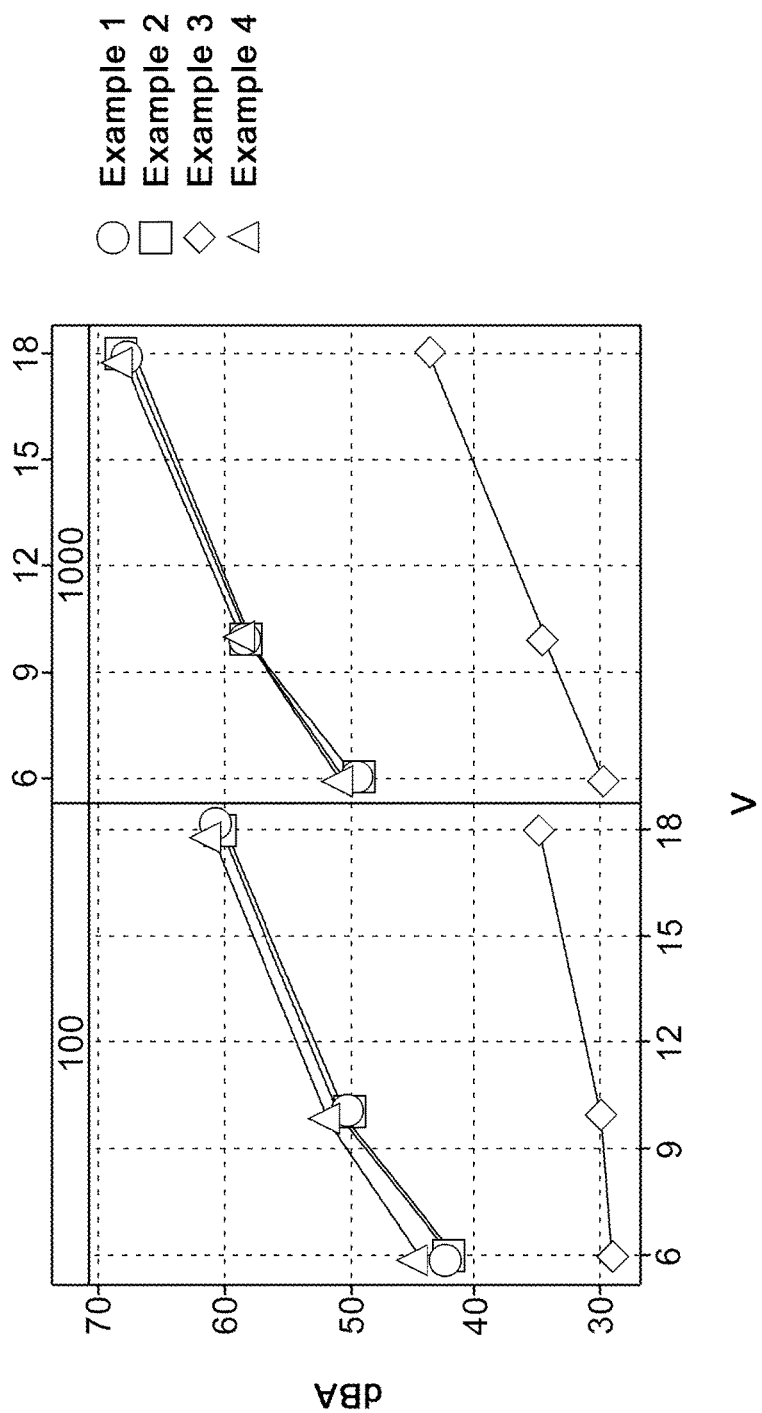
FIGS. 9 and 10 are graphical representations of embodiments of the invention.

An embodiment of an electronic component of the invention will be described with reference to FIGS. 9 and 10 wherein the advantages of asymmetry are demonstrated. FIG. 9 graphically illustrates microphonic noise generation as a function of voltage wherein microphonic noise generally increases with increased voltage. The results of FIG. 9 are for symmetrical MLCC having a structure as illustrated schematically in FIG. 1, and further in FIGS. 4A and 4B, wherein the number of conductive layers in a first conductive couple, A for example, is approximately the same as the number of conductive layers in a second conductive couple, B for example. In FIG. 9, Example 1 illustrates the noise generated when all capacitive couples are energized with the same phase at 100 kHz and 1000 kHz wherein the noise propagation is high and increases with voltage. In Example 2, the capacitive couples are energized with opposite phases and the improvement is minimal since the noise generated at that portion of the MLCC removed from the substrate is insufficient to mitigate the noise generated close to the substrate. Or restated, the noise generated by the capacitive couple closest to the substrate represents a majority of the total noise generated and therefore the capacitive couple further from the substrate cannot adequately cancel the noise of the closer capacitive couple. Example 3 illustrates the noise generated by energizing only the capacitive couple removed from the substrate and Example 4 illustrates the noise generated by energizing only the capacitive couple closest to the substrate. As would be realized the majority of the noise generation is from the capacitive couples closest to the substrate.

An asymmetrical MLCC is advantageous in some embodiments. Provided in FIG. 10 is a graphical representation of the noise generated in an MLCC prepared as illustrated in FIG. 1, and further in FIGS. 4A and 4B, except that about 80% of the total number of conductive layers form a first capacitive couple and about 20% of the total number of conductive layers form a second capacitive couple. The decibels as a function of voltage are illustrated at 100 kHz and 1000 kHz. In Examples 5-7 of FIG. 9, the MLCC is mounted with the first capacitive couple, comprising 80% of the total number of conductive layers, further from the substrate than the second conductive couple. In Example 5 both capacitive couples are energized with a common frequency. In Example 6 only the first capacitive couple, furthest from the substrate, is energized. In Example 7 only the capacitive couple closest to the substrate is energized. In Examples 8-10 the MLCC is mounted with the first capacitive couple, comprising 80% of the conductive layers, closest to the substrate. In Example 8 both capacitive couples are energized with a common frequency. In Example 9 only the first capacitive couple, closest to the substrate, is energized. In Example 10 only the second capacitive couple, furthest from the substrate, is energized.

Figure 10:
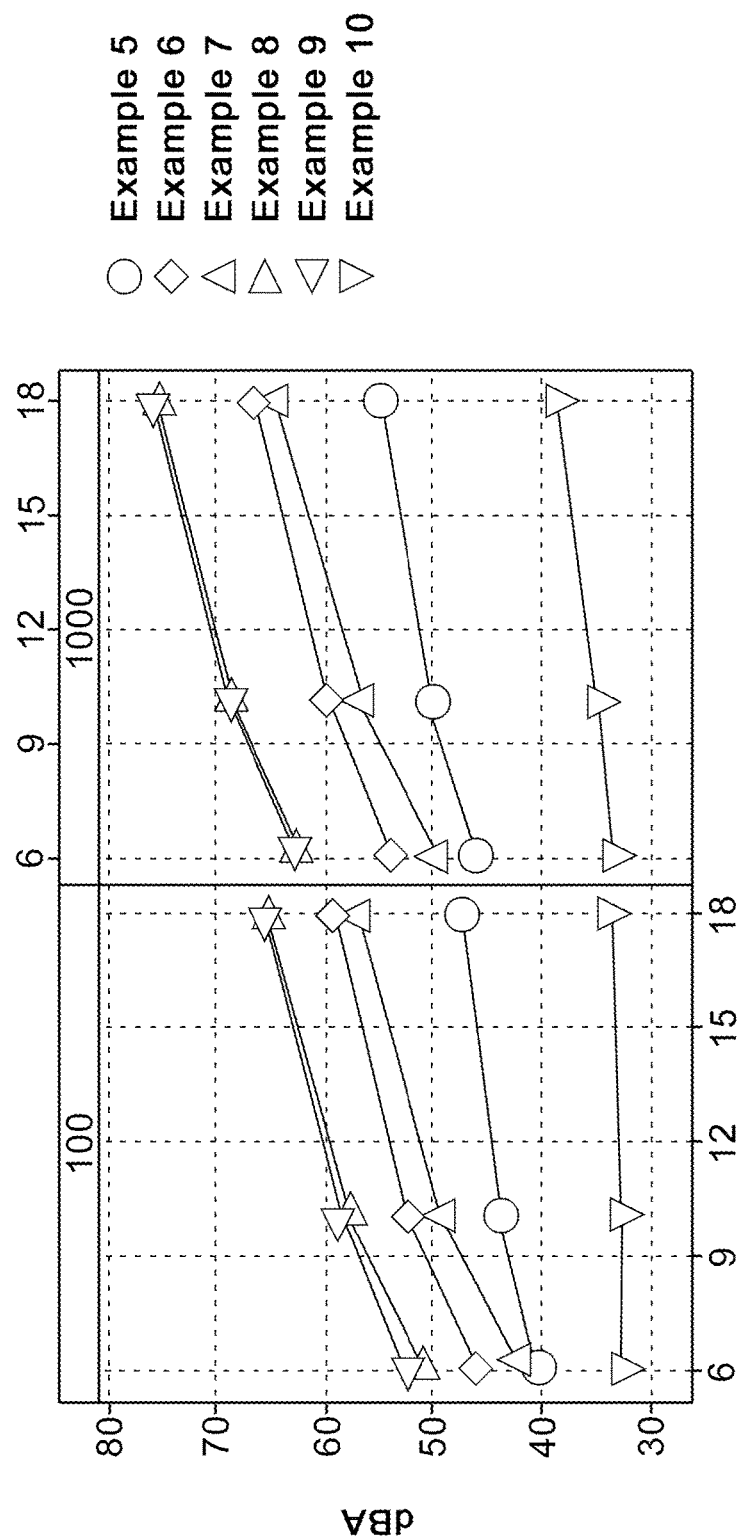

As would be realized from the examples in FIG. 10 a larger number of conductive layers can be arranged further from the substrate, thereby providing more capacitance as a function of MLCC volume. A fewer number of conductive layers can be arranged closer to the substrate to be energized out of phase with the capacitive couple. Therefore, the increased noise generation close to the substrate is adequate to dampen the noise generated by the larger number of conductive layers further from the substrate.

Figure 11:
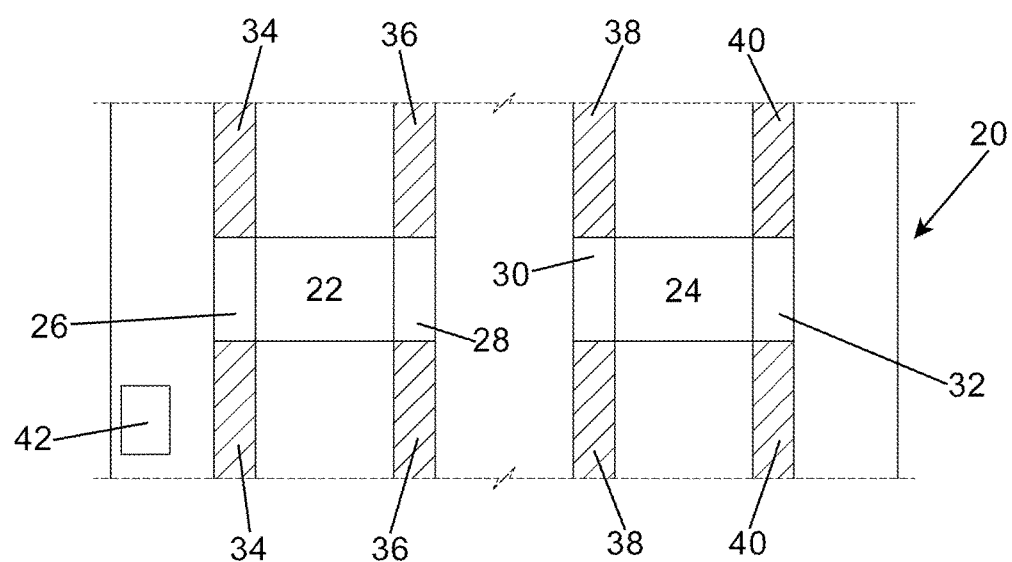
FIG. 11 schematic top view of an embodiment of the invention.

An embodiment of the invention is illustrated schematically in FIG. 11. In FIG. 11 two MLCC's, 22 and 24, which may be identical or different are mounted on a substrate, 20, as two elements of an array. An active MLCC, 22, has a cathode external termination, 26, in electrical contact with a cathode trace, 34, and an anode termination, 28, in electrical contact with an anode trace, 36. A noise mitigating MLCC, 24, which may also be active, has a cathode external termination, 30, in electrical contact with a cathode trace, 38, and an anode termination, 32, in electrical contact with an anode trace, 40. An AC generator, 42, provides a first AC signal to energize the active MLCC, 22, with a first phase and an AC signal to energize the noise mitigating MLCC, 24, with a second phase wherein the first phase and second phase are a different phase and preferably of opposite phase. The microphonic noise generated by the active MLCC will be mitigated by the microphonic noise generated by the noise mitigating MLCC as the noises will be out of phase and therefore noise cancellation will occur. The noise mitigating MLCC and active MLCC may be in close proximity on the substrate, which is preferred, or they may be in different sections, or different faces of the substrate.

For the purposes of the instant disclosure an active capacitive couple is a capacitive couple which functions primarily to provide capacitance to an electrical circuit. A noise mitigating capacitive couple is a capacitive couple which functions primarily to mitigate noise of an active capacitive couple. A capacitive couple may be solely active, solely noise mitigating or in some applications a capacitive couple may function as an active capacitive couple while also mitigating noise of a second active capacitive couple.

Noise is reported on a logarithmic scale as decibels or dBA. Even though it is preferable to eliminate all microphonic noise it is typically sufficient to decrease the microphonic noise by an order of magnitude to reduce the level below that which is detectable in the application. High quality noise-cancelling headphones, for example, may have a more stringent requirement than a portable music player.

There are several primary controls available in the instant invention for reducing microphonic noise at a given voltage. Optimization of the controls is determined by the application and the percentage of noise reduction necessary.

One control is the relative number of conductive layers dedicated to providing capacitance versus those dedicated to noise cancellation. As set forth herein, it is preferable to utilize fewer conductive layers for noise cancellation than necessary for providing capacitance with those dedicated to noise cancellation being located closer to the substrate. This provides the highest capacitance per unit volume while still minimizing microphonic noise.

An alternative control is the phase differential between the AC phase supplied to the capacitive couple dedicated for use as a capacitor versus the AC phase supplied to the capacitive couple dedicated to minimizing microphonic noise. It is preferable that the phases have at least a 120° difference as a phase difference of less than 120° provides minimal noise reduction and therefore the benefits are not fully realized. The AC phase supplied to the capacitive couple dedicated to noise reduction is therefore preferable 180°±60° out of phase relative to the AC phase supplied to the capacitive couple dedicated to capacitance. More preferably, the AC phase supplied to the capacitive couple dedicated to noise reduction is 180°±20° out of phase relative to the AC phase supplied to the capacitive couple dedicated to capacitance. Even more preferably, the AC phase supplied to the capacitive couple dedicated to noise reduction is 180°±10° out of phase relative to the AC phase supplied to the capacitive couple dedicated to capacitance and most preferably the two phases are approximately opposite as illustrated in FIG. 3.

The invention has been described with reference to the preferred embodiments without limit thereto. One of skill in the art would realize additional embodiments and alterations which are not specifically set forth but which are within the scope of the claims appended hereto which form an integral part of the instant application.

The invention claimed is:

1. An electronic component comprising:
    a pulse signal generator;
    a substrate comprising a first positive trace, a first negative trace, a second positive trace and second negative trace;
    an MLCC on said substrate wherein said MLCC comprises a first capacitive couple electrically connected between said first positive trace and said first negative trace and a second capacitive couple electrically connected between said second positive trace and said second negative trace; and
    wherein said pulse signal generator provides a first pulse to said first positive trace and a second pulse to said second positive trace wherein said first pulse and said second pulse are not in phase.

2. The electronic component of claim 1 wherein said first capacitive couple comprises alternating first internal electrodes wherein adjacent first internal electrodes are terminated to different first external terminations and said second capacitive couple comprises alternating second internal electrodes wherein adjacent second internal electrodes are terminated to different second external terminations.

3. The electronic component of claim 2 wherein said MLCC has a same number of said first internal electrodes and said second internal electrodes.

4. The electronic component of claim 2 wherein said MLCC has more said first internal electrodes than said second internal electrodes.

5. The electronic component of claim 4 wherein said second internal electrodes are closer to said substrate than said first internal electrodes.

6. The electronic component of claim 2 wherein said first internal electrodes and said second internal electrodes are parallel to said substrate.

7. The electronic component of claim 1 wherein said first pulse and said second pulse are out of phase by at least 180°±60°.

8. The electronic component of claim 7 wherein said first pulse and said second pulse are out of phase by at least 180°±20°.

9. The electronic component of claim 8 wherein said first pulse and said second pulse are out of phase by at least 180°±10°.

10. The electronic component of claim 9 wherein said first pulse and said second pulse are out of phase by 180°.

11. An electronic component comprising:
    a pulse signal generator;
    a substrate comprising first traces and second traces;
    a first MLCC comprising a first capacitive couple between two first external terminations wherein each first external termination of said first external terminations is in electrical contact with a different first trace of said first traces;
    a second MLCC comprising a second capacitive couple between two second external terminations wherein each second external termination of said second external terminations is in electrical contact with a different second trace of said second traces; and
    wherein said pulse signal generator provides a first pulse to said first traces and a second pulse to said second traces wherein said first pulse and said second pulse are not in phase.

12. The electronic component of claim 11 wherein said first capacitive couple comprises alternating first internal electrodes wherein adjacent first internal electrodes are terminated to different said first external terminations and said second capacitive couple comprises alternating second internal electrodes wherein adjacent second internal electrodes are terminated to different said second external terminations.

13. The electronic component of claim 12 comprising the same number of said first internal electrodes as said second internal electrodes.

14. The electronic component of claim 12 comprising more said first internal electrodes than said second internal electrodes.

15. The electronic component of claim 14 wherein said second internal electrodes are closer to said substrate than said first internal electrodes.

16. The electronic component of claim 12 wherein said first internal electrodes and said second internal electrodes are parallel to said substrate.

17. The electronic component of claim 11 wherein said first pulse and said second pulse are out of phase by 180°±60°.

18. The electronic component of claim 17 wherein said first pulse and said second pulse are out of phase by at least 180°±20°.

19. The electronic component of claim 18 wherein said first pulse and said second pulse are out of phase by at least 180°±10°.

20. The electronic component of claim 17 wherein said first pulse and said second pulse are out of phase by 180°.

21. An electronic component comprising:
a pulse signal generator;
an MLCC comprising a first capacitive couple having a first electrical contact with said pulse signal generator and a second capacitive couple having a second electrical contact with said pulse signal generator;
wherein said pulse signal generator provides a first pulse to said first capacitive couple through said first electrical contact and a second pulse to said second capacitive couple through said second electrical contact wherein said first pulse and said second pulse are not in phase.

22. The electronic component of claim 21 wherein said first capacitive couple comprises alternating first internal electrodes wherein adjacent first internal electrodes are terminated to different said first external terminations and said second capacitive couple comprises alternating second internal electrodes wherein adjacent second internal electrodes are terminated to different said second external terminations.

23. The electronic component of claim 22 comprising the same number of said first internal electrodes as said second internal electrodes.

24. The electronic component of claim 22 comprising more said first internal electrodes than said second internal electrodes.

25. The electronic component of claim 24 wherein said second internal electrodes are closer to said substrate than said first internal electrodes.

26. The electronic component of claim 22 wherein said first internal electrodes and said second internal electrodes are parallel to said substrate.

27. The electronic component of claim 21 wherein said first pulse and said second pulse are out of phase by 180°±60°.

28. The electronic component of claim 27 wherein said first pulse and said second pulse are out of phase by at least 180°±20°.

29. The electronic component of claim 28 wherein said first pulse and said second pulse are out of phase by at least 180°±10°.

30. The electronic component of claim 27 wherein said first pulse and said second pulse are out of phase by 180°.

31. An electronic circuit comprising an MLCC comprising a first capacitive element energized by an AC pulse having a first phase and a second capacitive element energized by an AC pulse having a second phase wherein said first phase and said second phase are out of phase by 180°±60°.

32. The electronic component of claim 31 wherein said first capacitive couple comprises alternating first internal electrodes wherein adjacent first internal electrodes are terminated to different said first external terminations and said second capacitive couple comprises alternating second internal electrodes wherein adjacent second internal electrodes are terminated to different said second external terminations.

33. The electronic component of claim 32 comprising the same number of said first internal electrodes as said second internal electrodes.

34. The electronic component of claim 32 comprising more said first internal electrodes than said second internal electrodes.

35. The electronic component of claim 34 wherein said electronic component further comprises a substrate and said second internal electrodes are closer to said substrate than said first internal electrodes.

36. The electronic component of claim 32 wherein said electronic component further comprises a substrate and said first internal electrodes than said second internal electrodes are parallel to said substrate.

37. The electronic component of claim 32 wherein said first pulse and said second pulse are out of phase by at least 180°±20°.

38. The electronic component of claim 37 wherein said first pulse and said second pulse are out of phase by at least 180°±10°.

39. The electronic component of claim 38 wherein said first pulse and said second pulse are out of phase by 180°.

* * * * *